Nov. 22, 1955 G. T. PERLOTTO 2,724,134
AUTOMATIC POWER PRESS TAPPING TOOL
Filed Aug. 5, 1952 2 Sheets-Sheet 1
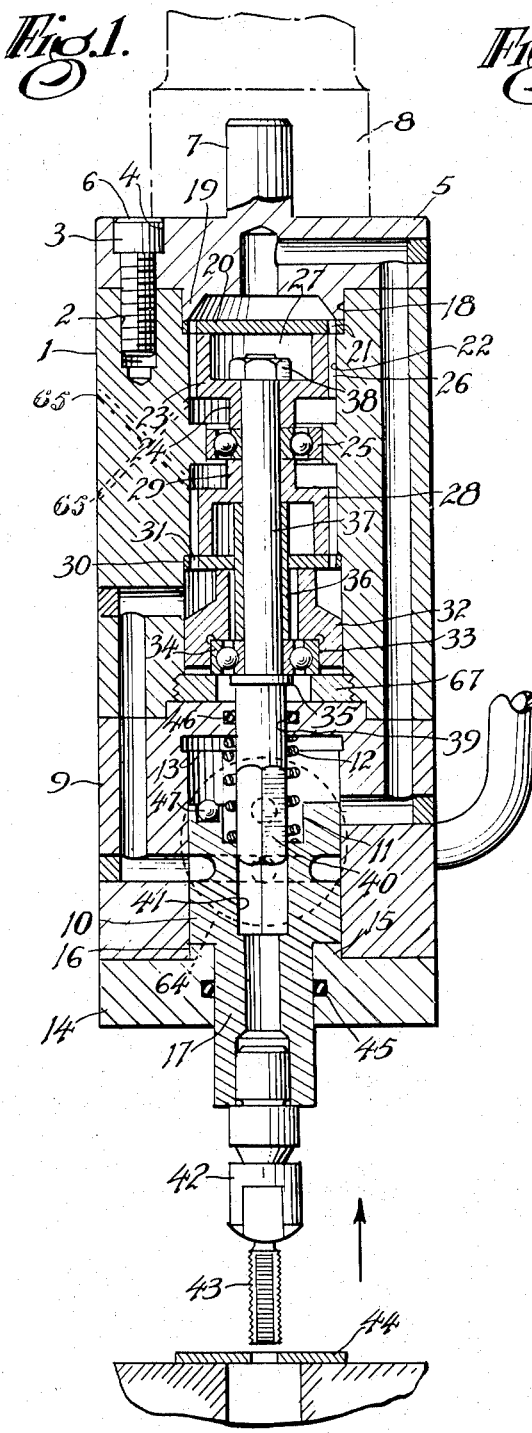
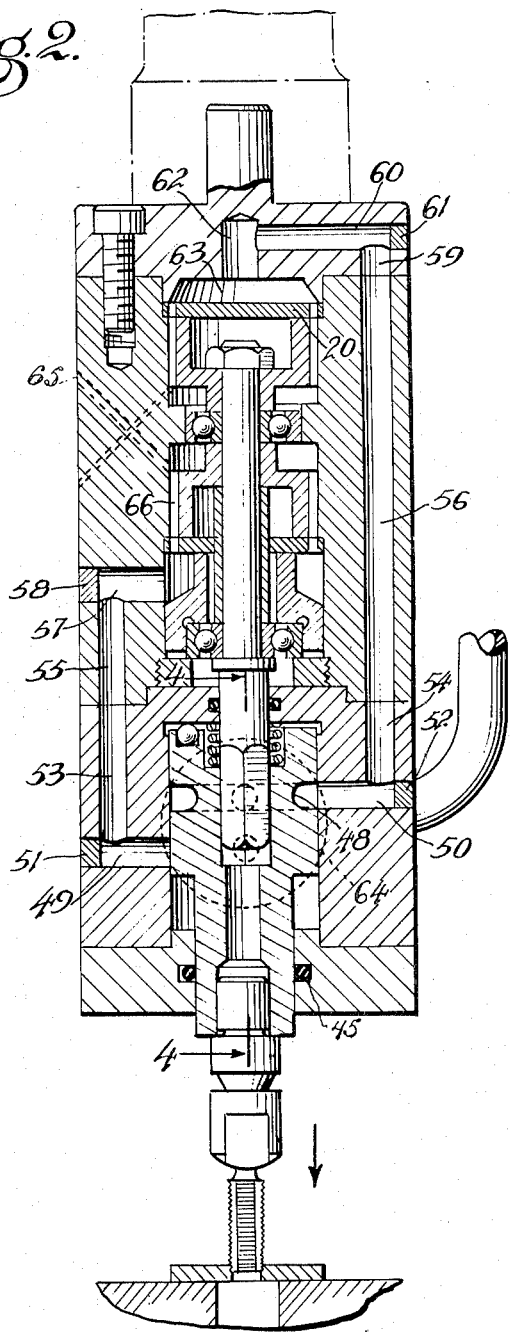
INVENTOR.
George T. Perlotto
BY Brown & Seward
his Attorneys Nov. 22, 1955        G. T. PERLOTTO        2,724,134
AUTOMATIC POWER PRESS TAPPING TOOL
Filed Aug. 5, 1952        2 Sheets-Sheet 2
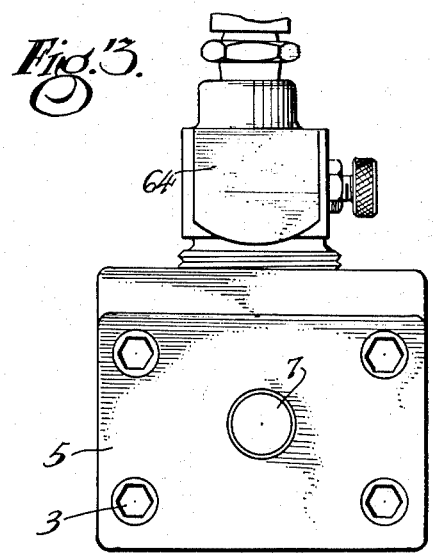
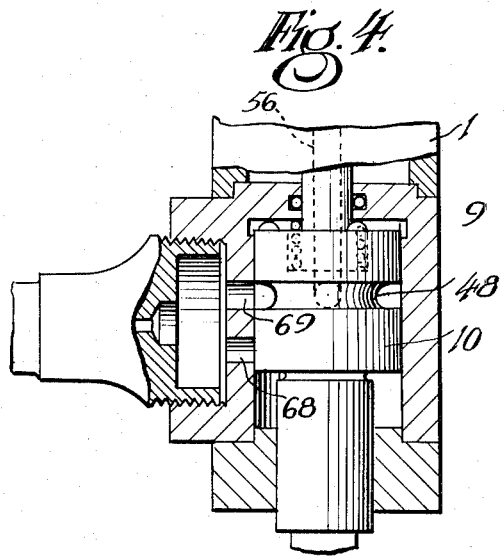
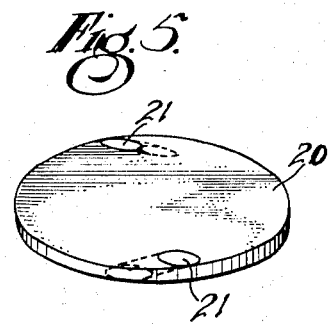
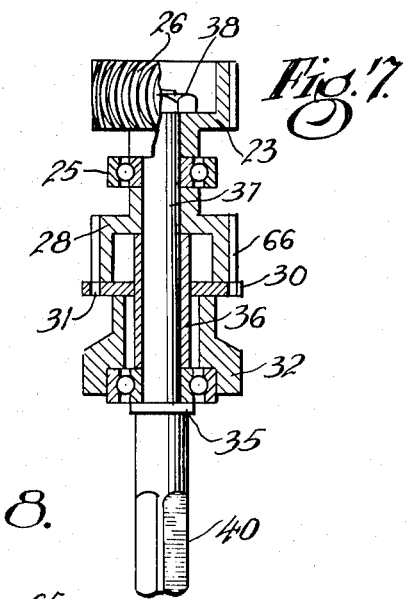
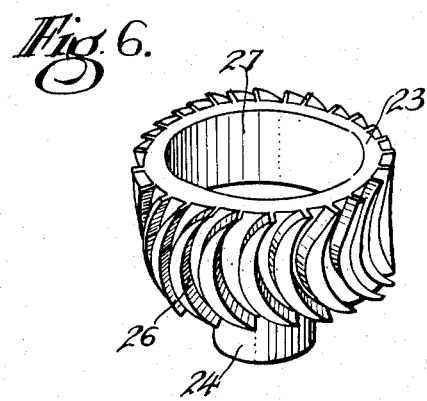
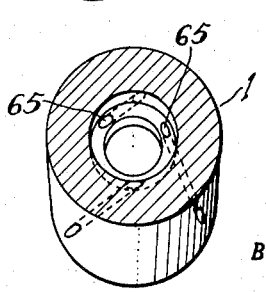
INVENTOR.
George T. Perlotto
BY Brown + Seward
his Attorneys United States Patent Office 2,724,134
Patented Nov. 22, 1955

2,724,134

AUTOMATIC POWER PRESS TAPPING TOOL

George T. Perlotto, Torrington, Conn.

Application August 5, 1952, Serial No. 302,768

12 Claims. (Cl. 10—136)

This invention relates and is directed to a tool, or assembly, which is entirely automatic in operation, including self reversal of certain rotatable elements at predetermined stages of performance.

Heretofore it has been necessary in the production of finished tapped holes, threaded as desired, to engage and retrieve the tap in a separate operation. I have overcome this problem by providing a tool which has application not only to tapping by power press, but which may also be used in and with other machine tools, drill presses, production millers and the like wherein completely automatic operation may be required.

The object of my invention is to provide an assembly capable of automatic operation when urged by any well known or approved power source and adapted to carry at its work engaging end any standard, or other, tool such as a tap, die or drill.

Another object is to provide an assembly of the character described which is self reversible at a predetermined position of the work engaging element.

Another object is to provide an assemble of the above type in which the driving parts are successively automatically actuated as a result of the position transmitted to the control valve by its work engaging element.

Another object is to furnish an assembly of the type set forth in which the means for imparting rotary motion to the work engaging element are driven by compressed air or other suitable fluid medium.

Another object is to provide a tool of the character described in which the parts are so constructed and arranged that the speed of rotation in one direction will equal the speed of rotation in the opposite direction.

A further object is to provide a tool of the type set forth in which the above and other objects may effectively be attained.

Broadly, my invention comprises an automatic tool adapted for use with a power press and comprising a casing or housing, capped at one end, and provided at the other with a valve body having its other extremity capped, other elements being rotatably hung in the casing, and means for driving these elements which are constructed and arranged to carry and impart motion to a work engaging tool.

A practical embodiment of my invention is shown in the accompanying drawings in which:

Fig. 1 represents a cut away vertical central section showing the work engaging member in its "extended" or "out" of contact position and being driven in "reverse";

Fig. 2 represents the embodiment shown in Fig. 1, the work engaging member being in position to operate in the "ahead" direction and make the tap;

Fig. 3 is a plan view of the means for supplying the driving medium to the valve from any outside source;

Fig. 4 is a detail, partly in section, of the air supply conduit and its relationship to the valve body and selector valve;

Fig. 5 is a perspective plan view of the top venturi disc;

Fig. 6 is a perspective view of the top rotor;

Fig. 7 is a detail showing the rotatable shaft and parts affixed thereto, partly in section and partly broken away; and Fig. 8 is a detail of part of the casing showing some of the exhaust ports.

It will be understood that the parts are numbered with their same numerals in each view, as set forth in the following specific description.

Referring to the accompanying drawings a casing or housing is denoted by 1 and is provided with a plurality of vertical threaded bores 2, in the present instance four, in its upper surface, said threaded bores being furnished to receive cap screws 3 countersunk at 4 in a housing cap 5 bored at 6 to fasten the cap to the casing. Said cap has an extending stud shaft 7 formed integral therewith and extending therefrom for engagement with a motion imparting source 8 (shown in dotted outline) adapted to raise and lower the cap 5, casing 1, and component parts of this embodiment of the invention now to be described.

Adjacent the face of casing 1, opposite from that contacted by cap 5, is a valve body 9 surrounding a movable selector valve 10 centrally recessed on one surface at 11 to accommodate an expansion spring 12, one end of which spring abuts the bottom of recess 11, its other end abutting the top of a recess 13 in the body 9 whereby the action of said spring 12 tends normally to longitudinally space the upper part of valve 10 from the top of recess 13.

A retaining cap 14 of any well known or approved type is furnished with an annular flange 15 which is surrounded by the depending skirt 16 of valve body 9, and, in turn, encompasses a reduced sleeve portion 17 of valve 10 limiting the longitudinal movement of valve 10 to a distance equal to the length of sleeve portion 17 above flange 15.

Casing 1, valve body 9 and retaining cap 14 are all centrally and vertically bored with bores of diameters suited to accommodate certain movable parts which are interconnected and located as follows:

Casing 1 is recessed centrally and vertically at 18 to take, at the top, the tapered vertical skirt 19 of housing cap 5, the bottom of recess 18 being fitted with a venturi disc 20 angularly bored through its horizontal faces with two holes 21 of predetermined angle and location.

Mounted for rotation in a reduced lower section 22 of recess 18 is a rotor 23 terminating at one end in a hub 24, the lower face of which rides on suitable bearings 25. The other end of rotor 23 abuts the lower surface of disc 20 and is provided at its outer circumference with a series of identical segments 26 shaped for operative relationship with holes 21 in disc 20, said rotor being recessed centrally and vertically in its upper face at 27.

Adjacent the bottom face of bearings 25 is a rotor 28 substantially identical in construction with rotor 23, but located with its hub 29 opposed to hub 24 thereof. This rotor 28 rests on a venturi disc 30 having holes 31, the discs being identical in construction, except that 30 has a central bore and 20 has none, but arranged with their like faces in opposed relationship, i. e., the bottom disc 30 is like disc 20 turned over, there being no bore in 20, as set forth above.

A bearing support 32 is recessed at 33 to accommodate suitable bearings 34 abutting annular collar 35, said support being separated by a spacer 36 from a shaft 37 longitudinally and centrally disposed in the structure. One end of shaft 37 is threaded to receive nut 38 between which nut and collar 35 is held an assembly comprising rotor 23, bearings 25, rotor 28, disc 30, spacer 36, bearing support 32, and bearings 34. An externally threaded nut 67 in casing 1 supports bearings 34. Below collar 35 shaft 37 passes through a central vertical bore 39 in valve body 9, through spring 12 and terminates in a squared portion 40 fitted in a bore 41 in valve 10 shaped to hold said portion 40 whereby the shaft 37 will be capable of imparting rotary action to said valve and other parts carried thereby including a chuck 42 carrying a tool 43 adapted to engage any desired price of work denoted by 44. Annular sealing rings 45 and 46 are seated in cap 14 and in valve body 9 adjacent to and contacting rotary shaft 37 and movable valve 10 in order to seal the said parts against the escape of air. These rings may be of any well known or approved type such as, for example, those composed of rubber and graphite.

The upper face of valve 10 is furnished with a plurality of ball bearings 47 (in the present instance three) to reduce friction between the said valve 10 and the face of its body 9 against which spring 12 abuts, sufficient compression of said spring resulting in the bearings contacting said body face.

The means for conveying the driving force to rotors 23 and 28 comprise an annular groove 48 in the outer circumference of the upper part of valve 10, which groove is located to connect with either the transverse bore 49 in valve body 9 or the transverse bore 50 in body 9, said bores being closed at one end by plugs 51 and 52 respectively. These transverse bores 49 and 50 connect respectively with vertically disposed bores 53 and 54 in body 9 which meet vertical bores 55 and 56 respectively in casing 1. Bores 55 and 56 terminate at their upper ends in transverse bore 57 in casing 1, closed by plug 58, and in vertical bore 59 of cap 5 respectively, the latter intersecting its transverse bore 60, the same being closed at its outer end by plug 61 and terminating at the other end in bore 62 directed to the top surface of disc 20, through bottom recess 63 in cap 5. Body 9, at a point opposite the upper portion of valve 10 is fitted with a conduit 64 connected to a source of power (not shown), such as a supply of compressed air, and bored to supply the annular groove 48 whether valve 10 is urged outwardly by spring 12 or whether the said spring is compressed. Casing 1 is provided with escape ports (in the present embodiment six) denoted collectively by 65, leading from the bottom and top edges respectively of rotors 23 and 28 outwardly through the circumference of casing 1.

The operation of my device is as follows: when the several elements have been assembled in the relationship above set forth, stud shaft 7 of cap 5 is connected to the desired motion imparting source 8 and the conduit 64 hooked up to body 9 and, by flexible coupling of any well known or approved type, to a source of compressed air, the flow of which is controlled in the usual manner. The tap or desired tool 43 is inserted in chuck 42 and the parts will now assume the position caused by the force of expansion spring 12, i. e., the valve 10 and parts carried thereby will be extended to the limit of movement through cap 14. At this point the air supplied through conduit 64 will pass into annular groove 48, through conduit hole 68, transverse bore 49, vertical bores 53 and 55, onto disc 30, through holes 31 therein and against the shaped segments 66 of rotor 28, causing the latter to rotate in "reverse" and turn shaft 37, valve 10 and parts carried thereby. The assembly is then moved longitudinally by means 8 until tap 43 engages work 44. This engagement will tend to compress spring 12 by causing valve 10 to move inwardly thereagainst to the position shown in Fig. 2, wherein transverse bore 49 is sealed off and groove 48 has access to conduit hole 69 and to transverse bore 50. Air will flow therethrough into bores 54, 56, 59, 60 and 62 onto disc 20, through its holes 21 into segments 26 of rotor 23 causing the latter to rotate in the opposite direction from 28, which has been stopped by the sealing off of bore 49. When the tap has reached the predetermined depth and the assembly is being returned to position for the succeeding operation the pressure will be thus taken off tap 43, spring 12 will expand, valve 10 will be moved thereby, bore 50 will be sealed off, bore 49 opened, rotor 23 stopped, rotor 28 started and the tap 43 will be automatically backed out. At the conclusion of this motion of means 8, the assembly is in readiness to repeat the above described operation.

It is to be understood that where parts are herein referred to as "top," "upper," "bottom," "vertical," "transverse," etc., the terms are used with relation to parts in positions they assume when a vertical operation is being effected. Obviously the assembly is readily adaptable for use at an angle, on the horizontal or vertically upward without modification of any consequence.

The machine is capable of use for tapping "right hand" or "left hand" threads merely by changing the positions of the rotors and can, of course, be used in numerous other applications such as drills or other operations where automatic reversal of rotation is either essential or beneficial in the withdrawal stage, and by supplying a jig plate drilled to accommodate several of the cap stud shaft 7, a plurality of these machines embodying my invention can be simultaneously used.

Since it is evident that various changes may be made in the construction, form and arrangement of the several parts without departing from the spirit and scope of my invention, I do not intend to be limited to the specific embodiment herein shown and described except as set forth in the appended claims.

What I claim is:

1. A tool comprising a casing, a cap closing one end thereof, a valve body held against the other end and a cap at the opposite end of said valve body, a rotatable shaft extending through said casing and body, a selector valve slidably engaged with and rotated thereby, a work engaging element carried by said selector valve and rotatable therewith, means on said shaft for successively driving same in opposite directions, resilient means for biasing the selector valve through the valve body and means for supplying the driving means placed in operative communication therewith by longitudinal displacement of said selector valve.

2. A tool comprising a casing, a cap closing one end thereof, a valve body held against the other end and a cap at the opposite end of said valve body, a rotatable shaft extending through said casing and body, a selector valve slidably engaged with and rotated thereby, a work engaging element carried by said selector valve and rotatable therewith, a plurality of rotors for successively driving said rotatable shaft in opposite directions, and resilient means for biasing the selector valve through the valve body, and means for supplying a fluid driving force to any of said rotors, said last named means being placed in operative communication with a rotor by said selector valve.

3. A tool comprising a casing, a cap closing one end thereof, a valve body held against the other end and a cap at the opposite end of said valve body, a rotatable shaft extending through said casing and body, a selector valve slidably engaged with and rotated thereby, a work engaging element carried by said selector valve and rotatable therewith, plural means for successively driving said rotatable shaft in opposite directions, and resilient means for biasing the selector valve through the valve body, and other means controlled by said valve for alternately supplying fluid driving force to said shaft driving means the parts being so constructed and arranged that longitudinal pressure on the work engaging element sufficient to overcome said biasing means will shift the valve longitudinally and activate the other of said shaft driving means to reverse the rotation of said shaft.

4. A tool comprising a casing, a cap closing one end thereof, a valve body held against the other end and a cap at the opposite end of said valve body, a rotatable shaft extending through said casing and body, a selector valve slidably engaged with and rotated thereby, a work engaging element carried by said selector valve and rotatable therewith, means for successively driving said rotatable shaft in opposite directions, resilient means for biasing the selector valve through the valve body, and other means for alternately supplying fluid driving force to said shaft driving means, said other means including spaced ports in the valve body, fluid access to said ports being controlled by the longitudinal position of the selector valve with relation thereto.

5. A tool comprising a casing, a cap closing one end thereof, a valve body held against the other end, a cap for said valve body, rotatable means mounted in said casing and valve body, said means comprising fluid driven elements affixed thereto for providing a reverse drive, a series of interconnected bores for supplying said fluid to said elements, a selector valve slidable and rotatable in said valve body to control said bores, a shaped portion on said rotatable means for slidably engaging said selector valve, resilient means for biasing the valve longitudinally, a work engaging element carried by said valve and rotated thereby, and means for limiting the longitudinal travel of said valve.

6. A tool comprising a casing, a cap closing one end thereof, a valve body held against the other end, a cap for said valve body, reversible rotatable means mounted in said casing and valve body, said means comprising fluid driven elements affixed thereto, a series of interconnected bores for supplying said fluid to said elements, a selector valve slidable and rotatable in said valve body to render operable said bores alternately, a shaped portion on said rotatable means for slidably engaging said selector valve, resilient means for biasing the valve longitudinally, a work engaging element carried by said valve and rotated therefrom, and means for limiting the longitudinal travel of said valve.

7. A tool comprising a casing, a cap closing one end thereof, a valve body held against the other end of said casing and a cap at the opposite end of said valve body, means operable within and through said casing, valve body and second cap, said means including a shaft, fluid driven means thereon and a selector valve slidably engaged with and driven by said shaft a work engaging element carried by said valve and other means for rotating said fluid driven means in opposite directions, the actuation of said other means being dependent upon the longitudinal position in the valve body of said valve which controls the supply of driving force to said fluid driven means.

8. A tool comprising a casing, a cap closing one end thereof, a valve body held against the other end of said casing and a cap at the opposite end of said valve body, means operable within and through said casing, valve body and second cap, said means including a shaft, fluid driven means thereon and a selector valve slidably engaged with and driven by said shaft, a work engaging element carried by said means and other means for rotating said first named means in opposite directions, said first named cap and casing being provided with connecting bores for passing driving fluid to said rotating means, the bores utilised being dependent upon the longitudinal position of said first named means with respect thereto as determined by the longitudinal status of the work engaging element carried by said first named means.

9. A tool comprising a casing, a cap closing one end thereof, a valve body held against the other end of said casing, a cap at the opposite end of said valve body and rotatable means mounted in said casing, body and second cap comprising a shaft, a plurality of rotors thereon for providing a reverse drive therefor, their bearings and a selector valve slidable on and rotated by said shaft operable, respectively, within and through said casing, body and second cap, a work engaging element carried by said rotatable means, cooperating bores in said casing, body and first named cap for passing driving fluid to said rotors, and other means engaging said body and valve for biasing the latter longitudinally, the rotor driven being dependent on the biased position of the valve with respect to a bore for passing said fluid to a rotor.

10. A tool comprising a casing, a cap closing one end thereof, a valve body held against its other end, a cap for said valve body, and rotatable means mounted in said casing, body and second cap including a shaft, a plurality of rotors thereon for providing a reverse drive therefor, their bearings, and a selector valve slidably engaged with said shaft and rotated thereby operable, respectively, through said casing, body and second cap, a work engaging element carried by said rotatable means, other means engaging said body and valve for biasing the latter longitudinally, and cooperating bores in said casing, body and first named cap for passing driving fluid to said rotors, the parts being so constructed and arranged that longitudinal pressure against the work engaging element moves the valve longitudinally to close one bore and open another to stop one rotor and drive the other.

11. A tool comprising a casing, a cap closing one end thereof, a valve body held against its other end, a cap for said valve body, and rotatable means mounted in said casing, body and second cap comprising a shaft, a plurality of rotors carried thereby, their bearings and a selector valve slidably engaged with said shaft and rotated thereby, a groove on said valve, cooperating bores in said first cap, casing and body for passing driving fluid to said rotors, a work engaging element carried by said rotatable means and a spring holding said valve in position to align the bores and groove for driving the rotatable means in one direction, the parts being so constructed and arranged that longitudinal pressure against the work engaging element causes the valve to stop the first rotor by blocking its supply bore and open the bore to the second rotor for reversing the direction of rotation of said rotatable element.

12. A tool comprising a casing, a cap closing one end thereof, a valve body held against the other end and a cap at the opposite end of said valve body, a rotatable shaft extending through said casing and body, a selector valve slidable on the shaft and rotated thereby, a work engaging element carried by said selector valve and rotatable therewith, cooperating bores in said first cap, casing and body, fluid actuated means for providing a reverse drive for said rotatable shaft, resilient means for biasing the selector valve through the valve body and supply means in said body adapted to be placed in communication with one of said fluid actuated means by the biased selector valve for driving said shaft.

References Cited in the file of this patent

UNITED STATES PATENTS

| Number | Name | Date |
|---|---|---|
| 764,498 | Poole | July 5, 1904 |
| 912,608 | Patterson | Feb. 16, 1909 |
| 1,242,933 | Fraser | Oct. 16, 1917 |
| 1,846,879 | Kurth | Feb. 23, 1932 |